United States Patent [19]

Keller et al.

[11] 3,781,152

[45] Dec. 25, 1973

[54] APPARATUS FOR PRECIPITATING A LAYER OF SEMICONDUCTOR MATERIAL FROM A GASEOUS COMPOUND OF THE SEMICONDUCTOR MATERIAL

[75] Inventors: Wolfgang Keller, Pretzfeld; Arno Kersting, Erlangen; Konrad Reuschel, Vaterstetten, all of Germany

[73] Assignee: Siemens Aktiengesellschaft, Munich, Erlanger, Berlin Germany

[22] Filed: Jan. 31, 1972

[21] Appl. No.: 222,127

Related U.S. Application Data

[62] Division of Ser. No. 872,278, Oct. 29, 1969.

[30] Foreign Application Priority Data

Oct. 30, 1968 Germany .................. P 18 05 970.6

[52] U.S. Cl. ............................ 425/174.8 R, 264/59

[51] Int. Cl. ........................ B29c 23/00, B29d 23/00

[58] Field of Search ................. 425/174 HD, 3, 112, 425/436, 449, 472, DIG. 33; 264/81, 59, 56

[56] References Cited

UNITED STATES PATENTS

| | | | |
|---|---|---|---|
| 3,139,363 | 6/1964 | Baldrey | 264/81 |
| 3,367,826 | 2/1968 | Heestand et al. | 264/81 |
| 3,477,885 | 11/1969 | Henker | 117/106 |
| 2,974,388 | 3/1961 | Ault | 264/221 X |

*Primary Examiner*—Robert L. Spicer, Jr.
*Attorney*—Arthur E. Wilfond et al.

[57] ABSTRACT

Apparatus for producing a hollow semiconductor body, particularly of silicon. Semiconductor is precipitated on the outer surface of a heated carrier body. The carrier body is thereafter removed without damaging the semiconductor body.

7 Claims, 5 Drawing Figures

APPARATUS FOR PRECIPITATING A LAYER OF SEMICONDUCTOR MATERIAL FROM A GASEOUS COMPOUND OF THE SEMICONDUCTOR MATERIAL

RELATED U.S. APPLICATION

This is a divisional application of application Ser. No. 872,278, filed Oct. 29, 1969.

It is known from French Pat. No. 1,511,998 to produce a silicon vessel wherein silicon wafers are subjected to a diffusion process by boring through a silicon rod. The rod can be obtained according to German Auslegeschrift No. 1,102,117 by precipitating upon a heated, elongated wire or thread shaped silicon carrier, additional silicon by thermal dissociation of a gaseous silicon compound around said wilicon wire.

According to German Pat. No. 1,061,593, a semiconductor rod can also be obtained by precipitating semiconductor material through a reaction with a gaseous semiconductor compound upon a heated rod shaped carrier body comprising the same semiconductor material. Here too, the rod shaped carrier body remains in the rod, produced through the precipitation of semiconductor material. If necessary, the semiconductor rod obtained by precipitation, can be thickened prior to boring out an opening, for example by subjecting said rod, according to German Auslegeschrift No. 1,148,525, to a crucible free zone melting process whereby said rod is compressed in axial direction, through a movement of the two rod ends toward one another.

The boring through a semiconductor rod is associated, however, with great losses of expensive semiconductor material. This applies particularly when thin-walled hollow bodies are to be produced, i.e. when the volume of the hollow space in the vessel comprising semiconductor material, which is to be produced, is to exceed the volume of the vessel wall.

The present invention has as its object remedying the above-described situation.

To this end, and in accordance with the invention, we precipitate a layer of semiconductor material, particularly silicon, from a gaseous compound of said semiconductor material on the surface of a heated carrier body comprising another, heat resistant material to produce a hollow body of said semiconductor material in such a manner that following the precipitation of the semiconductor layer the carrier body is removed without destroying the adequately thick semiconductor layer.

The carrier body can be removed with mechanical and/or chemical means.

In this manner hollow bodies of silicon, germanium or even of semiconducting intermetallic compounds of elements of the III and V groups of the periodic system of the elements such as indium antimonide or gallium arsenide, can be obtained.

It is known from U.S. Pat. No. 2,438,892 how to precipitate a thin silicon layer upon a tantalum band, by reducing gaseous silicon tetrachloride with hydrogen for the purpose of producing semiconductor components. It is further known, from U.S. Pat No. 2,763,581, to precipitate semiconductor material from a gaseous semiconductor compound, through thermal dissociation, upon a tungsten wire. In both methods, however, the metal carrier constitutes a part of the semiconductor component and is not removed form the precipitated semiconductor material.

Finally, it is known from the French Pat. No. 1,511,998, to line the inner walls of a hollow graphite cylinder, sealed on one side, with a layer comprising highly pure semiconductor material. Here too, the graphite is not subsequently removed from the layer of semiconductor material.

A further development of the prevent invention is that the carrier body is heated in regions and that the semiconductor material is precipitated in zones upon its outer face. As a result, a hollow body with varying wall thicknesses across its length can be obtained. Furthermore, the control of the thickness of the precipitated layer of semiconductor material is particularly simple. It is favorable to use a carrier body of an adequately high melting substance which neither alloys with the semiconductor material nor enters into a chemical compound therewith, at temperatures required for precipitation. Graphite, tantalum, molybdenum or tungsten are suitable materials.

Following the precipitation of the semiconductor layer, the carrier body can be removed through boring and/or milling the hollow body out of semiconductor material. Remnants of the carrier body can be removed, following the boring or milling, by etching with known etchants, as for example hydrofluoric acid. Graphite and metals are particularly easy to bore out or mill. The last remnants of the carrier body can be easy removed by etching from the hollow body out of semiconductor material, if the carrier body used is comprised of metal.

The carrier body can be burned out of the hollow body of semiconductor material also by a heating process effected in an oxygen-containing atmosphere. This is particularly recommended for a hollow silicon body with a graphite carrier body since heated silicon is coated in an oxygen-containing atmosphere, with a surface layer of oxygen which subsequently protects said silicon against further attacks by oxygen. The heating during the burnout process can be effected by regions, as during the precipitation process by carrying out (similarly to the zone melting method used for semiconductor rods), a relative movement between the carrier body provided with the layer comprising semiconductor material and a circular heating device surrounding the carrier body, said relative movement to be effected in the direction of the axis of the carrier body or the hollow body of semiconductor material, and if necessary repeated several times. The heating device can comprise, for example an induction coil, energized by alternating current and consisting of a liquid filled hollow conductor possessing one or a few windings. The heating device can also comprise a ring shaped electrical radiation heated which, if necessary, can be provided with a focusing device for the radiation. The burnout can be carried out in the open air or in a reaction container, in a pure oxygen atmosphere.

To produce a tube of semiconductor material, it is preferable to use a rod shaped carrier body of an appropriately large cross section and of any desired shape. This carrier body can be massive.

The use of a hollow carrier body is especially preferred, particularly when the hollow bodies has a large cross section of, for example from several square centimeters to one square decimeter and above. A hollow cylindrical carrier body is particularly preferred for producing a hollow cylinder of semiconductor material. The semiconductor material can be precipitated on the outer face of the hollow carrier body. This is particularly favorable when the carrier body is bored out or milled out since, compared to a massive carrier body, a considerable portion of the boring and milling operation can be saved.

To obtain hollow cylinders of semiconductor material it is preferred to precipitate, upon cylinder or ho'-low cylinder shaped carrier bodies, such semiconductor material layers whose thickness ranges from one-tenth of the inner diameter of the carrier body up to the inner diameter.

The same materials can be used for a hollow carrier body as for a massive one, namely, as stated above, a graphite or an adequate high refractory metal should be employed which does not enter into a chemical reaction with the semiconductor material nor alloys therewith. The carrier body can then be heated directly during precipitation, by means of an electric current passing therethrough.

When a hollow carrier body is being used, an induction heating coil or an electrical resistance heater can be arranged for heating purposes, inside the carrier body. The heat produced by the latter can be transferred through radiation or with the aid of an electrical insulating particularly pulverulent filler, through conduction upon a carrier body and the semiconductor layer precipitated thereon.

In larger cross sections, the difference of the contractions of the carrier body and of the hollow body of semiconductor material precipitated thereon can be so big, during the cooling process which follows the precipitation, that the carrier body can be pulled undamaged from the hollow body. This measure can be facilitated by the use of a carrier body which is conically tapered at the outer face, along its length. Another possibility with a similar effect is particularly feasible in a carrier body is a material other than graphite, by providing the outer surface of the carrier body whereupon the semiconductor material is precipitated, prior to precipitation, with a graphite coating. It is also recommended to soot the outer face of the carrier body.

A graphite coating also permits,for example,the use of a massive or hollow carrier body of cast iron or steel. The carrier body can also consist of a heat-resistant material which does not conduct electricity, preferably aluminum oxide or ceramic and can be provided prior to precipitation, at the outer surface, with a coating of graphite or of a refractory metal, such as tantalum or molybdenum. An aluminum oxide or ceramic carrier body has the special advantage that it shrinks more during cooling, than semiconductor material, for example silicon, and can therefore be removed from the hollow body, with particular ease.

The indicated measures and means can be applied not only for producing pipes of semiconductor material but also for producing hollow bodies of any other desired shapes. Under certain conditions it may become necessary, for the subsequent removal of the carrier body, to sever the precipitated semiconductor layer at one or several places. However, when a carrier of granite is being used, the opening in the semiconductor layer which is usually present, anyway, suffices for burning-out the carrier body, even if said opening is relatively narrow.

Some embodiment examples of the new method and other details are described as follows, with reference to the drawing.

Figures 1, 2, 3, 4, 5:
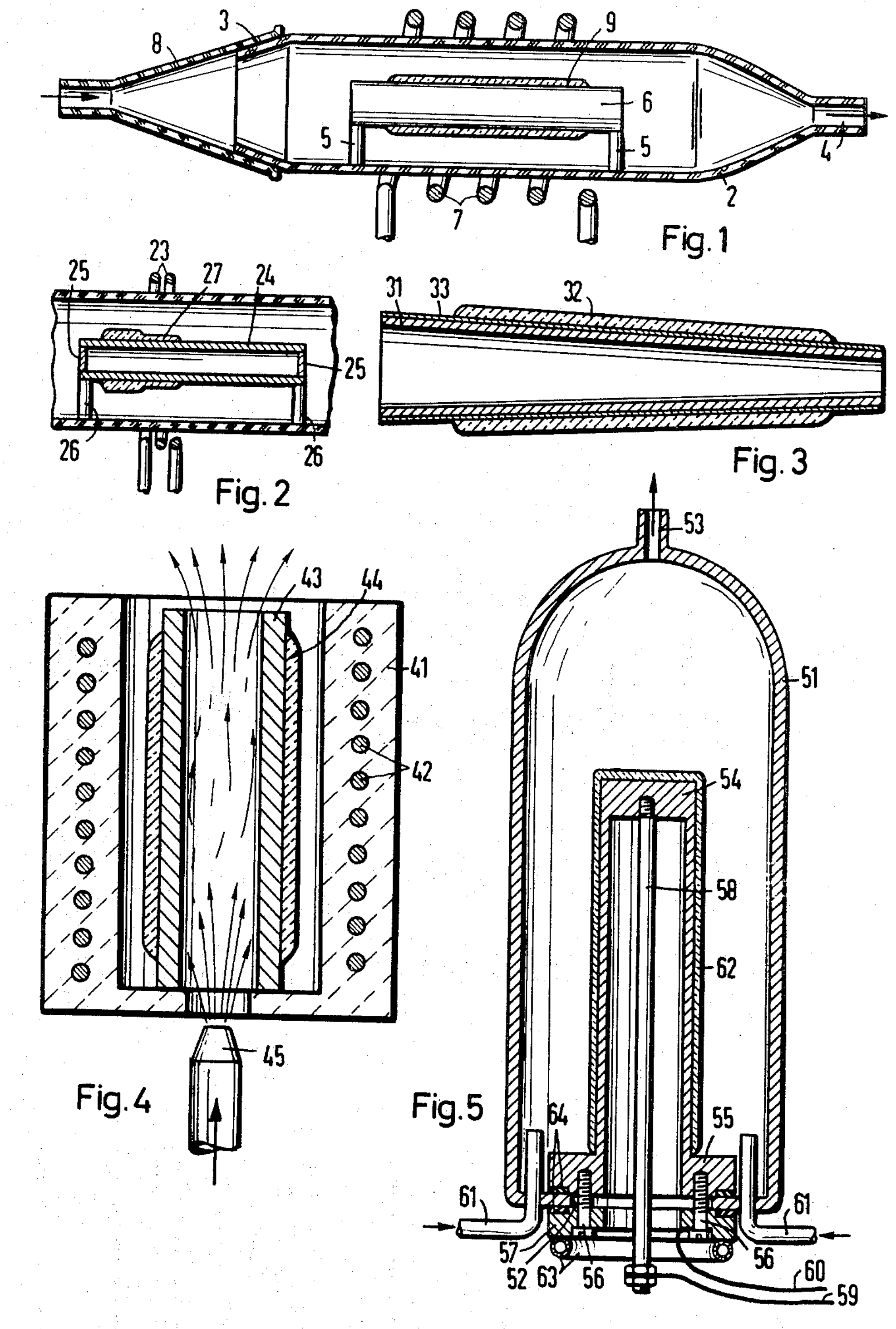
FIG. 1 shows a section through a device for precipitating a layer of semiconductor material.
FIG. 2 shows a modification in the device according to FIG. 1.
FIG. 3 shows a section through a carrier body with a layer of semiconductor material precipitated thereon.
FIG. 4 shows a furnace for burning the carrier body out of a precipitated layer of semiconductor material.
FIG. 5 shows another device for precipitating semiconductor material.

FIG. 1 shows a cylindrical quartz tube 2, one end of which is provided with a ground section 3 and the other end with an outlet 4. Situated within pipe 2 are two quartz bars 5 upon which rests a carrier body 6. The axis of the quartz tube 2 and of the carrier body 6 are preferably in alignment. At the location where the carrier body 6 is situated, the quartz tube 2 is enclosed by a multiwinding cylindrical coil 7, which is fed by a high-frequency generator, not shown. A gas inlet is positioned upon the ground section 3.

The carrier body 6 can be massive and comprised of graphite. A mixture of gaseous silico-chloroform ($SiHCl_3$) and molecular hydrogen ($H_2$) is introduced into the tube 2 through connecting part 8. The carrier body 6 is heated by high-frequency coil 7, to a temperature ranging between 1,050° and 1,250°C. The gaseous silico-chloroform is reduced by the hydrogen at the location of the carrier body 6 which is heated by a high-frequency coil 7 and a closed silicon layer 9 is precipitated on the carrier body. Hydrochloric acid escapes as a gaseous residue through the outlet 4 in the tube 2.

In the modification shown in FIG. 2 of the device of FIG. 1, the quartz tube only one section of which is shown, but which otherwise corresponds to quartz tube 2 of FIG. 1, is enclosed by a cylinder coil 23, which has only a few windings and which is, therefore, much shorter than the carrier body 24. These windings can also be displaced in the direction of the tubular axis. The carrier body 24 is a hollow cylinder comprising graphite, whose both ends are closed with a graphite stopper 25. The carrier body rests upon quartz bars 26. The coil 23 heats the carrier body 24, by regions and helps to deposit thereupon a coherent silicon layer 27. A device according to FIG. 2 makes it possible to precipitate a coherent silicon layer having varying layer thicknesses along the axis of the carrier body 24.

The carrier body 6 or 24 can be tantalum, molybdenum or tungsten. The removal of such carrier bodies from the hollow body formed through the precipitated silicon layer 9 or 27, is made easier when the outer surface of said carrier bodies prior to precipitation is coated with graphite or with soot.

The carrier body 6 or 24, comprised of aluminum oxide (ceramic), cast iron or steel can also be used and prior to the precipitation of silicon, their outer surfaces can be coated with grpahite or soot. Carrier bodies comprised of the latter material are particularly preferred since they possess a considerably greater thermal expansion coefficient, than silicon, germanium or semiconducting intermetallic compounds and thus shrink more, during the cooling process than the semiconductor layer deposited at their outer surface. As a result they can be removed without effort from the hollow bodies comprising the precipitated layer of semiconductor material. A chemical reaction or alloy formation of the semiconductor material with the cast iron or the steel, during precipitation, is prevented by the layer of graphite or soot present at the outer surface of the carrier body.

The conical tapering at the outer surface of a carrier body 31 illustrated in FIG. 3 facilitates the removal of the latter from the hollow body, comprising layer 32, for example silicon, without causing damage to said hollow body. It is recommended that said carrier body 31 be made of iron, steel or ceramic and be provided, prior to precipitation of the silicon, with a graphite coating 33.

If the carrier body comprises a relatively inflammable material, such as graphite, then it can also be removed by being burned out from the semiconductor material layer precipitated upon its outer surface. FIG. 4 shows an example of a device used to burn out the carrier body. This device comprises a ceramic furnace 41 with heating coils 42 arranged therein. In this furnace 41, a tubular carrier body 43 comprising graphite is arranged, whose outer surface has a precipitated silicon layer 44 deposited thereon. The furnace heats the carrier body 43 and the silicon layer 44 to a temperature of approximately 1,300°C. Air or oxygen is blown through the tubular carrier body 43 through a nozzle 45 arranged ahead of one of both furnace openings so that the graphite, of which carrier body 43 is comprised, burns. The heating of the carrier body 43 can also be effected by regions, during the burning process, by means of an induction coil that can be moved along the axis of the carrier body 43.

The precipitating device shown in FIG. 5 is particularly suited for use in connection with hollow carrier bodies. The device comprises a quartz bell 51 with a relatively large opening 52 and a relatively small gas outlet 53. The hollow carrier body 54, which can comprise graphite is closed at one end while its other end is provided with a flange 55. The flange 55 is attached to the large opening 52 of the quartz bell 51, by sealing rings 64. The attachment is effected with screws 56 and with the aid of a copper ring 57 provided with cooling coils 63. An iron rod 58 is affixed, for example in a tap hole, at the closed end of the carrier body 54. The rod being situated within the carrier body 54. Current leads 59 and 60 are attached to the iron rod 58 and to the copper ring 57 so that for heating purposes, the carrier body 54 can be passed by electric current. the reaction mixture, for example the gaseous silicochloroform and hydrogen is introduced into the bell 51 through opening 61 and a silicon layer 62 is precipitated upon the outer surface of said carrier body 54. The carrier body can also be heated by an HF induction heating coil, not shown in drawing and by a radiation heater, passed by electric current, which are arranged in the interior of said carrier body 54.

The method of the invention affords an excellent true measure for the inside area of the hollow body comprising the precipitated semiconductor material. Moreover, the structure of the precipitated semiconductor material is so dense that the hollow body can be considered to be, virtually, gas-tight. Measurements conducted at evacuated hollow bodies comprising silicon, yielded at room temperature, a leakage rate which amounts to less than $6.10^{-6}$ Torr. liter/sec. An increase in this rate was not observed, even at higher temperatures.

The hollow bodies produced in accordance wth the present invention when used, for example for cconversion into a monocrystal, can be subjected, following the fusing on of a monocrystalline crystal seed to one end of the hollow body, to a zone-melting process with one or several melting zone passages, issuing from the fusion point of the crystal seed.

What is claimed is:

1. Apparatus for producing a tubular silicon body comprising a reaction chamber, means on said reaction chamber for introducing a reaction gas, a carrier body in the form of a hollow finger-type element extending into said reaction chamber, said element being made of an electricity conducting material and defining a substrate upon which said tubular silicon body is precipitated, means detachably mounting said element in said reaction chamber, said hollow finger-like element having a closed longitudinal end disposed in said reaction chamber whereby the hollow interior of said element is isolated from the interior of said reaction chamber, a first electrical conductor disposed in the hollow interior of said element and in contact with said closed longitudinal end of said element, and a second electrical conductor in the form of an annulus contacting the opposite end of said element.

2. The apparatus of claim 1 wherein said hollow finger is cylindrical.

3. The apparatus of claim 1, which contains means for supplying the fresh reaction gas, at least at two diametrically opposed locations of the base of the hollow finger.

4. The apparatus of claim 3, which contains, above the hollow finger in the wall of the reaction chamber, means for the removal of the exhaust gas.

5. The apparatus of claim 3, wherein the hollow finger is made of a material selected from the group consisting of graphite, tantalum, molybdenum and tungsten.

6. Apparatus according to claim 1, wherein said element is open at the other longitudinal end thereof, said second electrical conductor being annularly disposed around said open longitudinal end.

7. Apparatus according to claim 1, wherein said means for detachably mounting said element provides a gas-tight seal.

* * * * *